US006477838B1

(12) United States Patent
Thoma et al.

(10) Patent No.: US 6,477,838 B1
(45) Date of Patent: Nov. 12, 2002

(54) HYDROSTATIC MACHINES FOR USE IN TRANSMISSION AND TRANSAXLE PRODUCT

(75) Inventors: Christian Helmut Thoma, Jersey (GB); George Duncan MacRae Arnold, Jersey (GB)

(73) Assignee: Hydro-Thoma Limited, Jersey (GB)

( * ) Notice: Subject to any disclaimer, the term of this patent is extended or adjusted under 35 U.S.C. 154(b) by 154 days.

(21) Appl. No.: 09/722,295

(22) Filed: Nov. 28, 2000

Related U.S. Application Data

(62) Division of application No. 09/255,447, filed on Feb. 23, 1999, now Pat. No. 6,178,746.
(60) Provisional application No. 60/080,217, filed on Mar. 31, 1998.

(51) Int. Cl.[7] .............................................. F16D 39/00
(52) U.S. Cl. ............................... 60/487; 60/489; 475/83
(58) Field of Search .......................... 60/487, 489, 493; 475/72, 83

(56) References Cited

U.S. PATENT DOCUMENTS

| | | | | |
|---|---|---|---|---|
| 2,186,409 A | * | 1/1940 | Ferris ........................ 60/489 X |
| 3,205,660 A | * | 9/1965 | Croswhite .................. 60/489 X |
| 3,354,637 A | * | 11/1967 | Croswhite .................. 60/489 X |
| 3,358,443 A |  | 12/1967 | Bjorklund ................... 60/487 X |
| 3,527,144 A |  | 9/1970 | Firth et al. ................. 60/487 X |
| 3,973,400 A |  | 8/1976 | Petersen .................... 60/487 X |
| 4,531,365 A |  | 7/1985 | Wanie ........................ 60/487 X |
| 4,578,948 A |  | 4/1986 | Hutson et al. ................. 60/487 |
| 4,914,907 A |  | 4/1990 | Okada |
| 4,979,583 A |  | 12/1990 | Thoma et al. |
| 5,042,252 A |  | 8/1991 | Havens et al. ................. 60/487 |
| 5,078,659 A |  | 1/1992 | von Kaler et al. |
| 5,136,845 A | * | 8/1992 | Woodley ................... 60/489 X |
| 5,234,321 A | * | 8/1993 | Gafvert ....................... 417/219 |
| 5,289,738 A |  | 3/1994 | Szulczewski ............. 60/487 X |
| 5,592,818 A |  | 1/1997 | Haag et al. ................... 60/487 |
| 5,709,084 A |  | 1/1998 | Krantz ...................... 60/487 X |
| 5,765,512 A |  | 6/1998 | Fraser ........................ 123/54.1 |
| 5,802,851 A |  | 9/1998 | Krantz ........................ 60/487 |
| 5,992,150 A |  | 11/1999 | Eberle .......................... 60/487 |
| 6,014,861 A | * | 1/2000 | Hauser et al. ................ 60/487 |
| 6,058,703 A | * | 5/2000 | Smith ....................... 60/489 X |
| 6,151,990 A | * | 11/2000 | Johnson et al. ............... 475/72 |
| 6,178,746 B1 | * | 1/2001 | Thoma et al. ................ 60/487 |

\* cited by examiner

Primary Examiner—John E. Ryznic
(74) Attorney, Agent, or Firm—Young & Thompson

(57) ABSTRACT

An improved hydrostatic transmission useful as a speed changing device having a single output shaft or a pair of outwardly extending shafts for use, for example, in small vehicles such as lawn and garden tractors. The hydrostatic transmission output may be mechanically coupled to the wheel driving axle by a gear or chain drive, or alternatively may have such means included in the same housing package containing the hydrostatic transmission. When a differential action is needed between the drive wheels of the vehicle, the differential may then also be included in the same housing package. In whichever of such configurations, the hydrostatic transmission comprises a radial piston pump fluidly coupled to a single or twin larger displacement axial piston motor of the swash-plate type by means of a fluid coupling valve supported by the housing. The pump is superimposed on the motor for compactness and the respective operational advantages that each type has is optimised for overall improved performance of the hydrostatic transmission.

23 Claims, 6 Drawing Sheets

HYDROSTATIC MACHINES FOR USE IN TRANSMISSION AND TRANSAXLE PRODUCT

This application is a divisional of Application Ser. No. 09/255,447, filed on Feb. 23, 1999 now Pat. No. 6,178,746, which claims the benefit under 35 U.S.C. §119(e) of Provisional Application No. 60/080,217 filed Mar. 31, 1998, the entire contents fo which are hereby incorporated by reference.

BACKGROUND OF THE INVENTION

The present invention relates to hydrostatic piston machines used in power transmission and transaxle product and is concerned with an improved pump and motor configuration. Although in most instances, single motor hydrostatic transmissions are the normal, some applications do exist where two hydraulic motors are required.

Hydrostatic transmissions act as means for converting rotary mechanical motion, typically provided by an internal combustion engine, to fluid motion by means of a shaft driven hydraulic pump and where the pump is fluidly connected to one or more hydraulic motors. The volume and direction of the fluid delivery to the motor or motors being governed by the displacement setting of the pump, and the motor is the mechanism for converting the fluid motion back to mechanical rotary motion. By regulating both the amount and direction of fluid motion between the pump and motor, usually achieved through the use of a variable-displacement pump, the output speed and rotational direction of the motor can be precisely controlled at a set input rotational speed of the pump. This device is useful in driving vehicles such as lawn and garden tractors or any apparatus requiring precise speed control. In many such applications, the hydrostatic transmission is ideally integrated as part of an overall transaxle driving apparatus which further incorporates speed reducing means and, in the case of the single motor arrangement, a differentialled axle as shown in U.S. Pat. No. 4,979,583 entitled Variable Speed Transaxle.

Hydrostatic transmissions of the type which are fully integrated in a transaxle housing structure containing speed reduction gearing and mechanical differential are fast becoming the preferred driving apparatus for lawn tractors and the like, and are currently either of the type where the hydrostatic transmission utilises an axial piston swash-plate configuration for both the pump and motor or a radial piston configuration for both the pump and motor.

In the axial piston variety of integrated hydrostatic transaxles, the pump and motor are fluidly connected together by means of a center-section which generally is a "L" section configuration containing both fluid passages and valves as well as valve-plate surfaces either formed integral to it on two exterior surface arranged perpendicular to one another on the center-section or as separate components mounted and fixed to such surfaces on the center-section. An example of such axial piston hydrostatic transaxles is shown in the Okada et al. U.S. Pat. No. 4,914,907 and units built to this design, although proven to be both durable and performance worthy, are still significantly more expensive to produce compared to the less sophisticated mechanical gear-shift transmission/transaxle.

At the present time, the need to include such a center-section, which due to its complexity, is the single most expensive item required in the axial piston pump and motor configuration, is a serious obstacle hindering further price reduction. A further problem exists because center-sections are constructed from die-cast or cast aluminium material and porosity in the material surrounding the high-pressure internal fluid passages can, if present to any significant degree, result in a loss of operating efficiency due to the leakage of high-pressure fluid. A still further problem presents itself when the aluminium material is used as the operating surfaces on which the cylinder-barrels revolve. As aluminium is not so durable as compared to steel or iron, the surfaces can wear out prematurely, again resulting in a loss of operating efficiency due to increased leakage of high-pressure fluid.

With respect to the alternative type of hydrostatic unit currently sold in the market and which employs a radial piston pump and radial piston motor configuration, the fluid connection is, by contrast, achieved simply and more economically by using a pintle-valve. Such a pintle-valve is simple to produce and compares extremely favourably in terms of manufacturing cost with their center-section counterpart used in the axial piston design. Pintle-valves are constructed in steel and are heat treatable to provide a very strong and hard wearing operating Subsurfaces against which the cylinder-barrels revolve. Even so, because the standard orientation in the drive-line installation for almost all lawn and garden vehicles, irrespective whether the hydrostatic transaxle uses radial pistons or axial pistons, requires a 90 degree shift in the rotational axis between the input shaft and the axle output shafts, the radial piston type of hydrostatic unit requires additional components in the form of bevel gearing. Such bevel gearing can be positioned behind the hydraulic radial piston motor as is shown in Thoma et al. U.S. Pat. No. 4,979,583 or alternatively in front of the hydraulic radial piston pump as is shown in von Kaler et al. U.S. Pat. No. 5,078,659 However, in either arrangement, the need to include such bevel gearing increases the selling price of the product and may unless the gearing correctly mesh, result in higher than desirable generated gear noise during operation.

The present invention is directed at overcoming the above described disadvantages by way of using the best features of the radial piston pump configuration and the best features of axial piston motor configuration whereby the center-section of the type shown in Okada et al is redundant and the bevel gears shown in Thoma et al or von Kaler et al are redundant. A desirable feature of the radial piston pump is that high speed rotation of the piston carrying cylinder-barrel produces a centrifugal effect on the pistons propelling them radially outwards from their cylinders to improve the draw of fluid into the cylinder. A desirable feature of the axial piston motor design having stick or cylindrical pistons is that the stroke to piston diameter ratio is always greater than the radial piston motor. As a result, based on the same diameter of piston and same number of cylinders, the axial piston motor provides an automatic hydraulic displacement reduction whenever fluidly coupled to a radial piston pump, and this has the great advantage that less speed reduction is needed between the motor and the output power transmission shaft or shafts.

SUMMARY OF THE INVENTION

From one aspect the invention consists of a hydrostatic transmission located within a chamber defined by a surrounding housing structure and comprising a hydraulic pump and at least one hydraulic motor fluidly coupled together; an input drive-shaft rotatably supported in said housing and drivingly connected to said hydraulic pump, said pump having a first cylinder-barrel containing an array of radially arranged cylinders and a radial piston disposed in each of said radial cylinders and where the stroking axes of said radial pistons all lie along a common plane normal to the rotational axis of said first cylinder-barrel; said at least one motor having a second cylinder-barrel containing an array of axially arranged cylinders set equally spaced apart about a circle described by the stroking axes of axial pistons disposed in said axial cylinders to lie radially within the radial outer dimension of said second cylinder-barrel such that the stroking axes of said axial pistons lie parallel to the rotational axis of said second cylinder-barrel.

Although the embodiment used to illustrate this invention is a transaxle unit useful for a vehicle application where a differential action is required between the drive wheels, the invention is also applicable to transaxles where no differentialled action is required between the respective output axle shafts, either by omitting the differential or by adding an extra hydraulic motor in the transaxle in place of the differential. Furthermore, the invention is useful for a self-contained power transmission unit having a single or double output power transmission shaft that may or may not include speed reducing gearing within the same housing package.

The cylinder-barrel of the radial piston pump is driven by an input power transmission drive-shaft, either through some preliminary gearing or, preferably directly, and where the cylinder-barrel is supported for rotation on a cylindrical surface on a fluid coupling valve. Radial pistons are disposed within an array of radial cylinders provided in the cylinder-barrel and protrude from their respective cylinders to be operatively connected to a surrounding annular track-ring, and where the track-ring is adjustable is its position relative to the radial position of the cylinder-barrel such that its eccentricity can be changed enabling the delivered fluid medium to be varied in both quantity and direction to the hydraulic motor. The cylinder-barrel of the axial piston motor includes a plurality of axial cylinders in which axially sliding pistons are contained. Springs between each axial piston ensure that the cylinder-barrel is biased towards a flat surface on a fluid coupling valve and where the cylinder-barrel is connected to a drive shaft for the onward transmission of mechanical power. The axial pistons protrude from their respective axial cylinders and are operatively connected to an angle thrust plate, also called a fixed-angle swash-plate. Fluid delivered by the pump radial pistons is arranged to pass through internal passages in the fluid coupling valve to enter each of the axial cylinder chambers in turn that are provided in the cylinder-barrel of the hydraulic motor.

With the single pump/single motor configuration, the fluid coupling valve comprises a cylindrical element and a block element; and where the cylindrical element supports the cylinder-barrel of the radial piston pump and where the block element has a flat surface provided on which the cylinder-barrel of the hydraulic motor contacts. In the region where the cylindrical and block elements contact their respective cylinder-barrels, a pair or arcuate-slots are provided to allow fluid within the fluid coupling valve to enter through cylinder-ports the cylinders provided in each of the cylinder-barrels. The cylindrical element may be extended axially to extend beyond and below the pump cylinder-barrel to interface with a concave part-cylindrical surface formed on the block element. When two motors are required, the block element is provided with a second flat support surface such that each cylinder-barrel of the two hydraulic motors has its own flat support surface to contact. Alternatively, there may be two block elements used in the two motor hydrostatic transmission, and in this case, the downwardly extending portion of the cylindrical element interfaces on one side with a concave part-cylindrical surface formed on one of the block elements as well as with a concave part-cylindrical surface formed on the other block element on the opposite side.

It is an object of the invention to provide a improved hydrostatic transmission or transaxle that is both ecomonic and compact, especially in terms of height, where the relatively flat pancake shaped radial piston pump is superimposed above the more cylindrically shaped axial piston motor or motors.

A object of the invention to exploit the nature advantages inherent in the respective radial piston pump and axial piston motor configurations in order to reduce the amount of final drive train gearing necessary to accomplish a multiplication in torque to the drive wheels of the vehicle. In the example set forth, the usual stroke to diameter ratio of the radial piston ball pump is 30% whereas the usual stroke to diameter ration of the axial piston stick motor is 70% thereby providing a greater than 2:1 hydraulic reduction assuming same diameter and number of cylinders in the pump and motor.

It is a further object of the invention to provide a simple but effective interface between the cylindrical element and the block element of the fluid coupling valve in a manner whereby the 90 degree shift in the axis of rotation between the radial piston hydraulic pump and the axial piston hydraulic motor or motors can be effected without the complexity of the prior art where either, bevel gears are required, or expensive and complex centre-sections are needed which suffer on occasion due to porosity or wear problems associated with the die-cast aluminium material.

It is a still further object of the invention to provide a more durable transmission or transaxle product whereby the critical operating surfaces on which the cylinder-barrels of both hydraulic pump and hydraulic motor revolve is constructed of a hard wearing surface of steel or iron material. In terms of the axial piston hydraulic motor, this invention allows the use of a sintered powder-metal iron valve-plate product in place of the aluminium material used in the prior art types incorporating an aluminium center-section.

BRIEF DESCRIPTION OF THE DRAWINGS

Other features and objects of the invention, and the manner of attaining them, may be performed in various ways and will now be described by way of example with reference to the accompanying drawings, in which.

Figure 1:
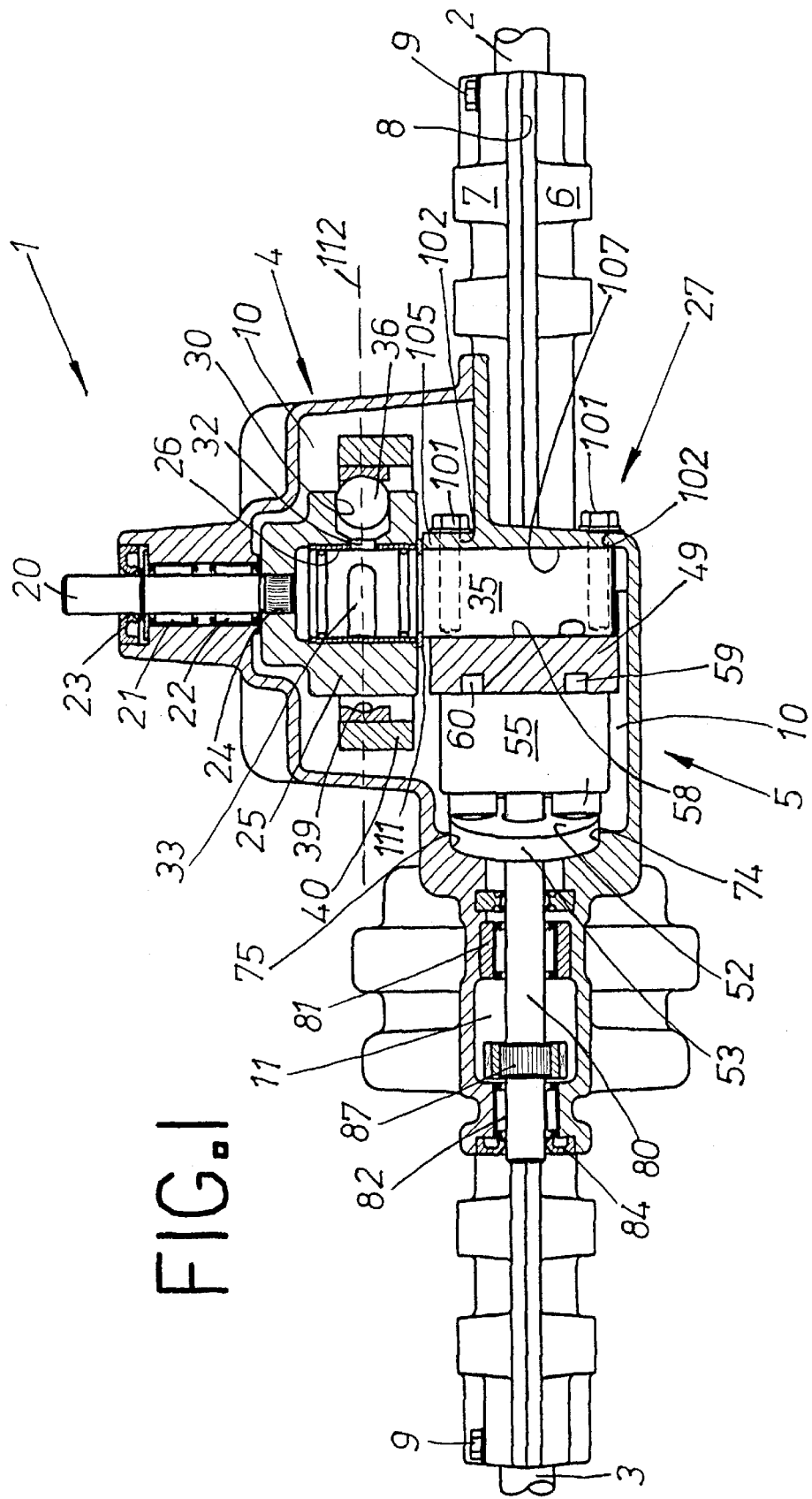
FIG. 1 is a part-sectioned side view of the hydrostatic transmission in a transaxle embodiment according to the invention.

The hydrostatic transaxle unit I is provided with outwardly extending output power transmission shafts 2, 3, also known as axles or axle shafts, and includes within its surrounding housing structure, an internally disposed radial piston hydraulic pump 4 fluidly coupled to an axial piston hydraulic motor 5. The housing being formed by two housing member elements called the case 6 and cover 7 which connect together along a parting-plane 8 and which, for convenience, can be located on the same plane that intersects the axis of rotation of the output shafts 2, 3. Although the housing as illustrated has case and cover elements meeting on a parting-plane arranged to be parallel to the rotational axis of the cylinder-barrel of ther hydraulic motor makes, the teachings of this invention may be applied to other housing designs, for instance, where the housing structure has two or more elements, at least two of which are arranged to be separable along a parting-plane normal to the rotational axis of the cylinder-barrel of the hydraulic motor.

Output shafts 2, 3 being rotatably supporting in the housing. A series of screws 9 are used hold the case 6 and cover 7 together, the abutting surfaces having sealant such as anaerobic sealant applied prior to the case 6 and cover 7 being attached together in order that the internally formed chambers are isolated from the surrounding environment of the transaxle. In the space defined within the case 6 and cover 7, either a single internal chamber is formed or alternatively as here shown, two chambers marked as chambers 10, 11. The hydraulic pump 4 and hydraulic motor 5 are located within chamber 10 whereas speed reduction gearing shown as 15, and when required, a mechanical differential shown as 16, are located within chamber 11. Hydraulic motor 5 is drivingly connected to the output shaft or shafts 2, 3 by speed reducing gearing 15, and the purpose for the incorporation of such speed reducing gearing 15 is to provide a torque multiplication between the hydraulic motor 5 and shafts 2, 3. When the mechanical differential is required in place of a single shaft extending from both sides of the housing, the differential is inserted between the speed reducing gearing 15 and shafts 2, 3. For many vehicle applications when wheels are fixed to axle output shafts 2, 3, the inclusion of a differential is important as it allows normal differentiation between left and right drive wheels of the vehicle such as a lawn or garden tractor, and helps prevent lawn damage, especially when tight turns are undertaken. Therefore, for such applications, the differential can be included in the same housing package.

A belt driven input-shaft 20 rotatably supported by bearings 21, 22 in the cover 7 protrudes into chamber 10 to be drivingly engaged by means of splines 24 with the cylinder-barrel 25 of the radial piston pump 4. A rotary seal 23 surrounding input drive-shaft 20 prevents the power transmission fluid contained within chamber 10 from escaping. For sake of definition, cylinder-barrel 25 of the pump 4 is termed the first cylinder-barrel. First cylinder-barrel 25 is supported for rotation on a cylindrical support surface 26 on the upper portion of cylindrical element 35 which together with block element 49 forms the fluid coupling valve indicated by reference numeral as 27 in FIG. 1. As described below in more detail with reference to numerals, the hydraulic pump 4 is fluidly coupled to the hydraulic motor 5 by the fluid coupling valve 27. A number of communication passages within fluid coupling valve 27 serve to hydraulically link the first cylinder-barrel 25 of the hydraulic pump 4 with the cylinder-barrel 55 of the hydraulic motor 5. For sake of definition, the cylinder-barrel 55 of the hydraulic motor 5 is will termed the second cylinder-barrel.

First cylinder-barrel 25 has an array of radially arranged cylinders 30, each of which is provided with a cylinder-port 32 located at the bottom of the cylinder bore 30. All cylinder-ports 32 are arranged to be in a fixed axial distance with respect to a pair of arcuate shaped slots 33, 34 in cylindrical element 35, and where arcuate shaped slots 33, 34 form the first porting junction of the hydrostatic transmission. Each of the cylinder-ports 32 is arranged to pass across each of the arcuate-slots 33, 34 in turn, during rotation of the shaft 20 driven cylinder-barrel 25. Cylindrical element 35 is provided with internal fluid passages shown as 28, 29 that connect the respective arcuate-slots 33, 34 of the first porting junction with ports 37, 38 that form part of the third porting junction and where a pair of corresponding ducts 47, 48 on block element 49 form the other part of the third porting junction.

The type of piston used for the hydraulic pump in this embodiment is the solid steel ball type 36 although the well known form of cylindrical piston with articulating slipper may be used in place of the ball piston. With reference to FIG. 1, each cylinder 30 contains within a ball piston 36. The ball operate on against a hardened cam surface of track-ring 40.

Figure 3:
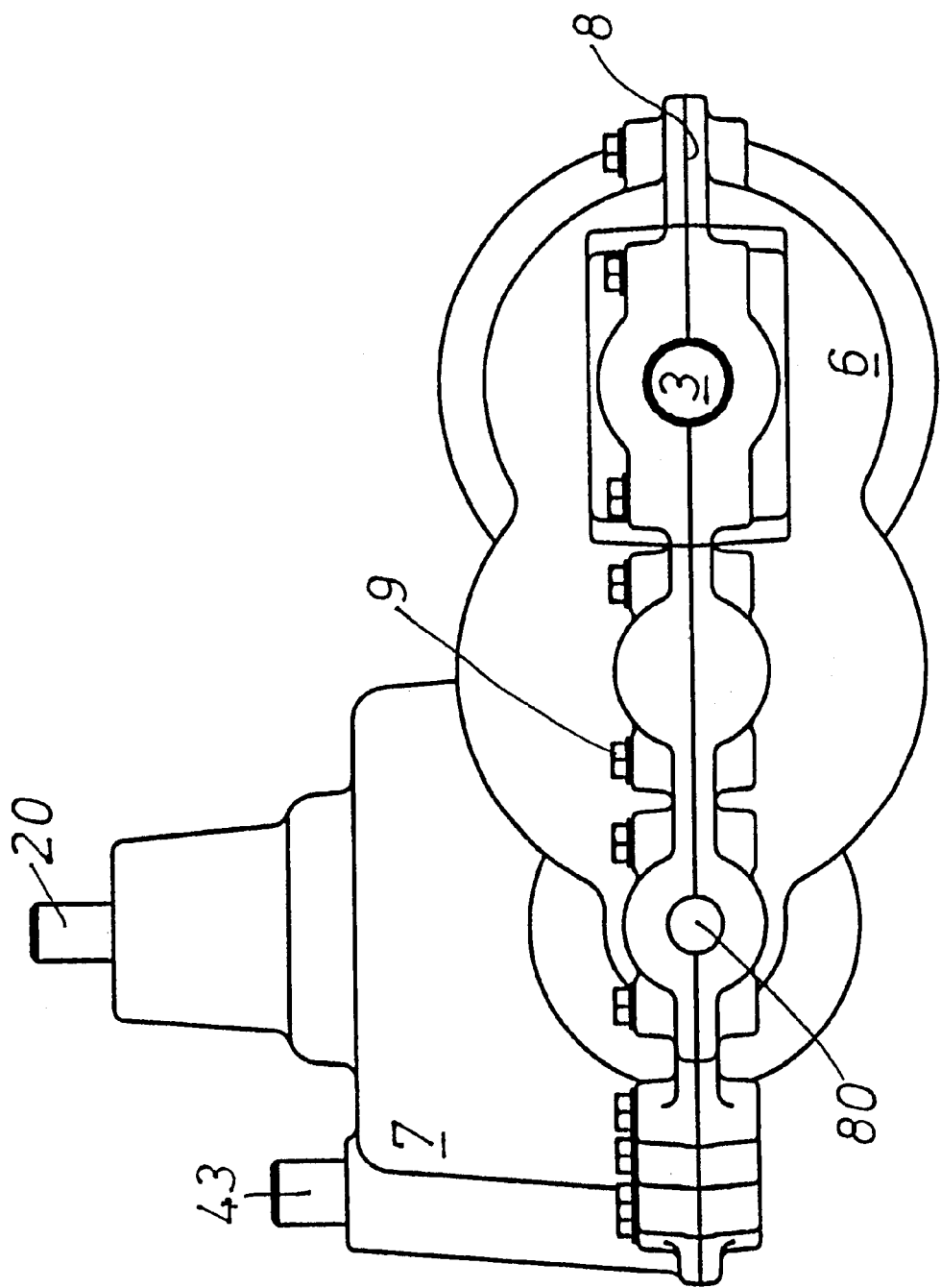
FIG. 3 is an external side view of the transaxle of FIGS. 1 and 2.
Figure 4:
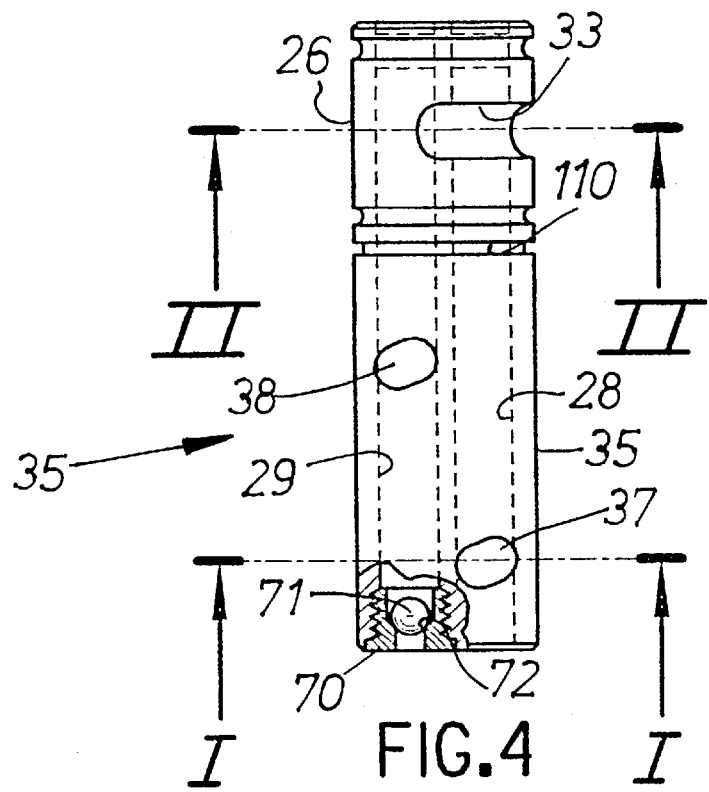
FIG. 4 is a view of the cylindrical element.
Figure 5:
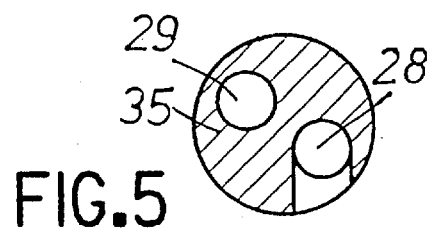
FIG. 5 is a sectional view alone section I—I of FIG. 4.
Figure 6:
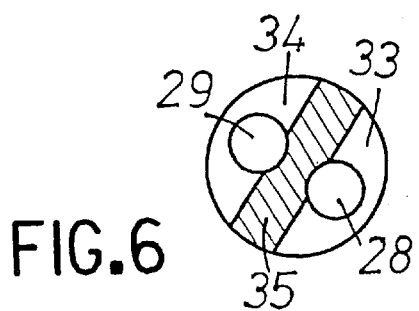
FIG. 6 is a sectional view alone section II—II of FIG. 4.
Figure 7:
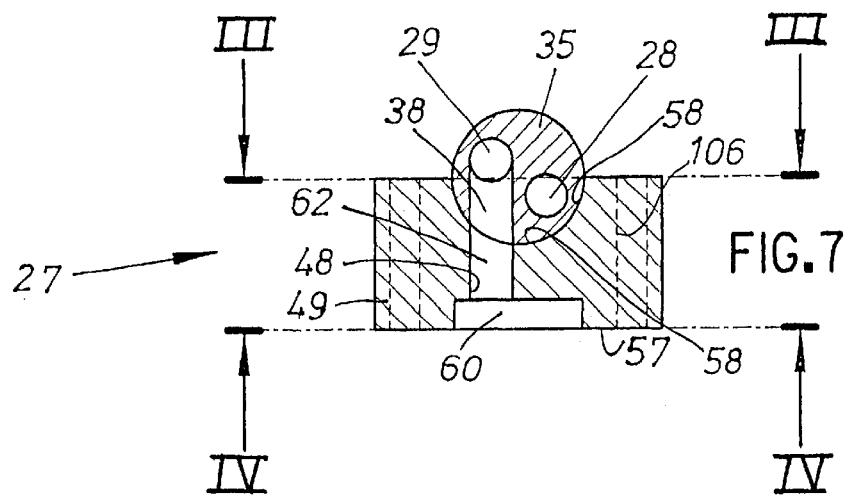
FIG. 7 is a sectional view of the cylindrical and block elements.
Figure 8:
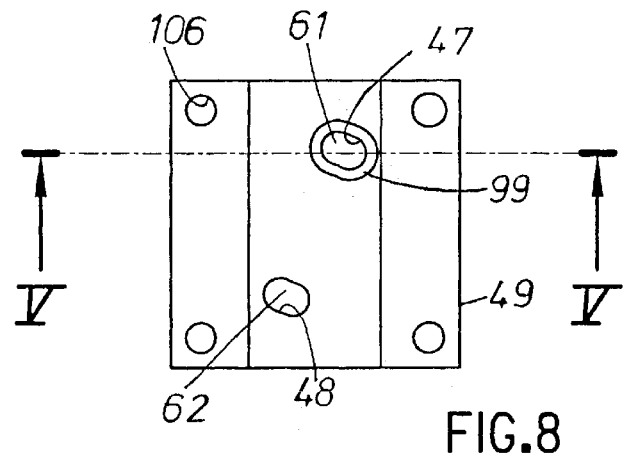
FIG. 8 is a side view of the block element on its part-cylindrical surface side as viewed from line III—III of FIG. 7. with the cylindrical element removed for greater clarity.
Figure 9:
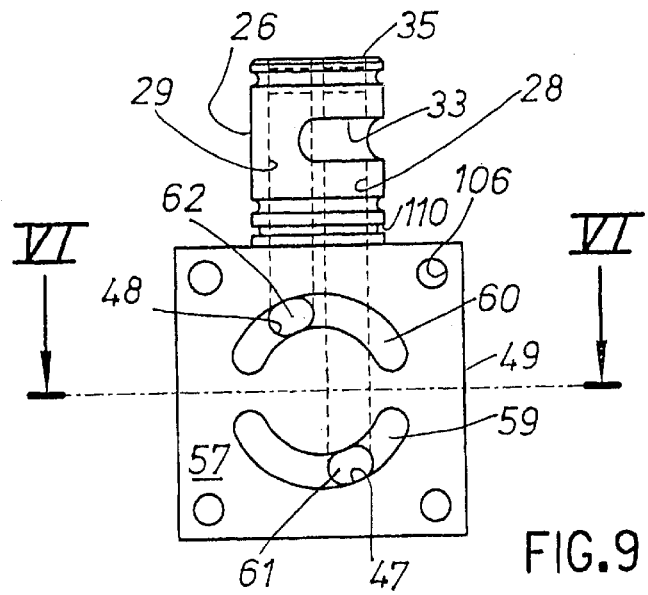
FIG. 9 is an side view of FIG. 7 viewed on line IV—IV. of FIG. 7.
Figure 10:
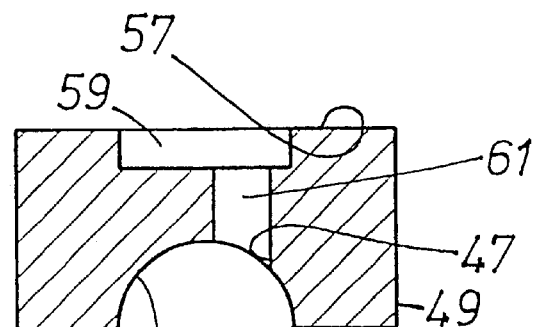
FIG. 10 is a sectional view on line V—V of FIG. 8.
Figure 11:
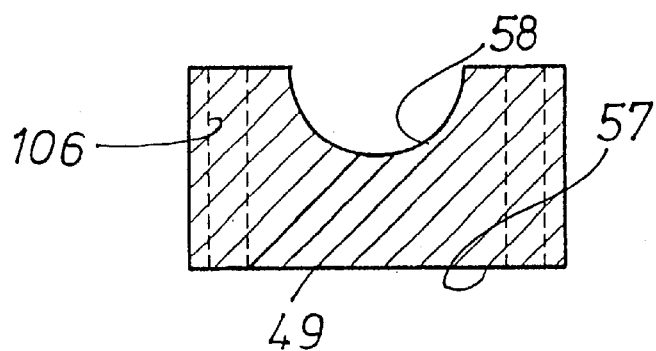
FIG. 11 is a sectional view on line VI—VI of FIG. 9.

During high-speed rotation of first cylinder-barrel 25, centrifugal forces propel the ball pistons 36 into operational engagement with the cam surface 39, and where the track-ring 40 is provided with pivotable movement about pivot-pin 41 by means of pin being journalled in hole 42, so that the quantity of fluid passing into and through the fluid coupling valve 27 to hydraulic motor 5 can be varied, and when necessary, reversed in direction. A speed control-shaft 43 for the hydrostatic transmission, shown journalled in housing cover 7 in FIG. 3. is connected to track-ring 40 by means of link-pin 44 and control-pin 45. Control-pin 45 is journalled in hole 46 in track-ring 40 such that angular movement of control-shaft 43 by the transmission operator produces a change in the positional relationship of the track-ring 40 with respect to the fixed radial positions of both the cylindrical element 35 and the first cylinder barrel 25. Once track-ring 40 is eccentric in position, pistons 36 commence reciprocation and the fluid inside their cylinders 30 is displaced through cylinder-port 32 and flow thereby takes place between arcuate-slots 33, 34. During high speed input drive-shaft 20 rotation, the centrifugal effect, automatic with the radial piston pump types, enhances the ability for the fluid to be picked-up from whichever is the lower pressure of the two arcuate-slots 33, 34 for complete filing of the expanding cylinder volume space 30 vacated by the outwardly moving piston.

Ports 37, 38 on the third porting junction join with respective ducts 47, 48 provided on the block element 49 which forms the lower portion of fluid coupling valve 27, ducts 47, 48 being positioned on the concave part-cylindrical surface 58. Block element 49 is provided with a flat support surface 57 to one side and a concave part-cylindrical surface 58 on the opposite side. Second cylinder barrel 55 in association with flat support surface 57 and where a pair of arcuate-slots 59, 60 are provided which form the second porting junction.

The axial piston hydraulic motor 13 has therefore a cylinder-barrel 55 which carries an array of axial cylinders 50 each housing a piston 51 and where the pistons 51 are operatively connected to the operational surface 52 of thrust plate 53. Each cylinder 55 communicates via its respective cylinder-port 56 in sequence the arcuate-shaped slots 59, 60 provided on block element 49. Arcuate-slots 59, 60 communicate in block element 49 via respective passages 61, 62 ducts 47, 48. Ducts 47, 48 joining ports 37, 38 on the third porting junction so that fluid passing through fluid coupling valve 27 from first cylinder-barrel 25 can flow to second cylinder-barrel 55.

Figure 2:
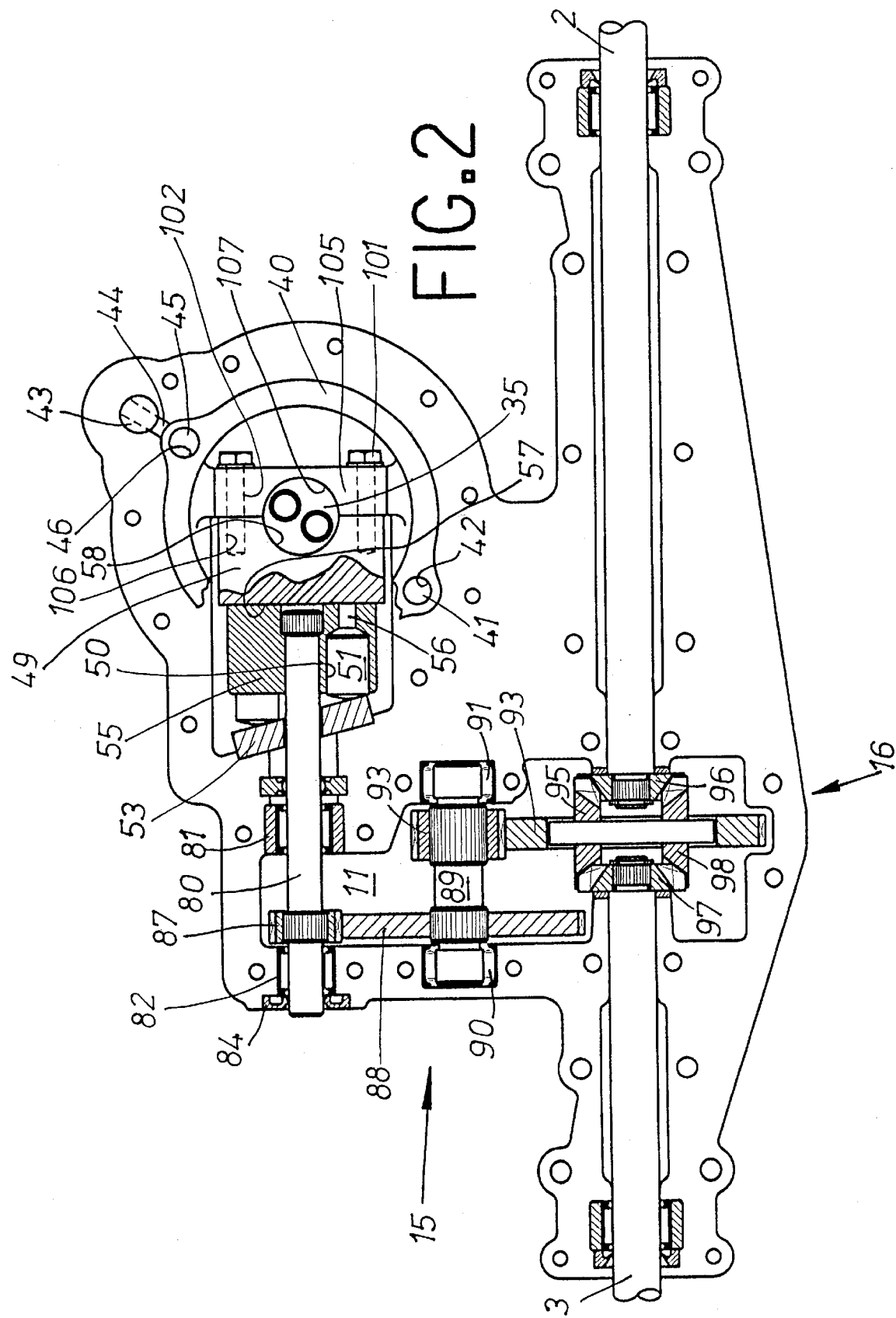
FIG. 2 is a view of FIG. 1 with the cover housing removed in order to show the position of the internal elements.

Although not shown, a spring may be deployed in each of the cylinders so that the pistons 51 are biased against the operating surface 52 of the thrust-plate 53. The opposite reaction force produced by such springs is also useful because it biased the second cylinder-barrel 55 onto and against the face surface 57 of block element 49. The thrust-plate 53 remains permanently inclined with respect to longitudinal axis of pistons 51 and may be held in position by being pinched tight between adjacent walls 74, 75 in housing members 6, 7. Because it is most common that the inclination angle of the thrust-plate 53 remain permanently at a fixed inclination angle as depicted in FIG. 2, the reciprocating stroke of the pistons 51 in the hydraulic motor 5 remains constant, and the direction of rotation of the motor continues in the same direction unless the fluid received from the pump 4 is either stopped or reversed. As the fluid received from pistons 36 of the hydraulic pump 12 can be changed in direction through the action of rotating control-shaft 43 one way or the other and thus changing the eccentricity of track-ring 40, the rotation of the hydraulic motor 5 can thus be reversed.

Check-valves may preferably be located right at the lowest portion of the cylindrical element for each internal fluid passage, such check-valve 70 for passage 29. The inclusion of such check-valves, also known as make-up valves, is a necessary requirement in such hydrostatic transmissions as during operation, a small amount of leakage occurs from the high pressure power transmission circuit, and any such lost fluid needs to be replenished. This is achieved by means of a ball 71 in the check-valve 70 rising off its seat 72 to allow reservoir fluid with chamber 10 to be drawn into internal fluid passage 29.

Second cylinder-barrel 55 is drivingly engaged to shaft 80 to rotate at equal speed, and thus rotation of cylinder-barrel 55 causes rotation of shaft 80. As fluid enters each of the cylinders 50 in turn through their respective cylinder-ports 56, the pressurised fluid acting on the inner end of the pistons 51 causes the pistons to slidably move axially outwards in the direction of the open end of the cylinder 50, and because of the piston reaction against the angled thrust-plate 53, an angular driving moment is created on the cylinder-barrel 55 which as a result, is caused to revolve. Thereby, combined rotation of the cylinder-barrel 55 and shaft 80 is transmitted through the speed reducing gears 15 to the differential 16 and axle output shafts 2, 3 of the hydrostatic transaxle 1 which may be attached to the drive wheels of the vehicle.

Shaft 80 is supported by bearings 81, 82 located between housing elements 6, 7. Shaft 80 may protrude from the transaxle 1 as shown in order that a conventional disc parking brake (not shown) such are well known in the art can be attached. A seal 84 is also provided to surround shaft 80 in order to prevents fluid seeping out of internal chamber 11.

A gear 87 fixed to shaft 80 is in mesh with gear 88 which is fixed to intermediary-shaft 89. Intermediary shaft 89 is supported by bearings 90, 91 in similar manner to that described for the shaft 80. Gear 93 fixed to intermediary-shaft 89 is in mesh with ring-gear 94 of the differential-assembly 16.

The differential-assembly 16 further comprises four bevels gears 95, 96, 97, 98 being visible in FIG. 2. so that power can be transmitted to the axle-shafts 2, 3 in a manner already well established in the art.

FIGS. 4 to 11 are included to better illustrate the cylindrical element 35 and the block element 49 that form the fluid coupling valve 27 for a single pump/single motor hydrostatic transmission. Sealing at the third porting junction surface may be performed by the inclusion of ring type seals around each of the ducts 47, 48 or through the application of a suitable liquid sealant at the interface of the third porting junction surface which, once it has hardened as the interconnecting parts squeezed out the air from the sealant solution, forms a tight seal. When mechanical sealing means are to be deployed, a groove 99 is provided to surround either or both ducts 47, 48 so that an "O" ring type seal ring can be used.

Cylindrical element 35 becomes clamped between the block element 49 and directly or indirectly on the housing by the application of a number of fixing screws 101. Although alternative means may be used to hold the fluid coupling valve 27 to the housing structure, the example as here shown has some of the screws 101 passing through holes 102 provided on a raised surface 105 of housing case element 6 to enter threaded holes 106 in block element 49.

As shown in FIGS. 1 & 2, the interior of case housing member 6 includes a concave part-cylindrical support surface 107 against which the lower or second cylindrical portion of cylindrical element 35 is seated. The action of tightening screws 101 in block element 49 pulls the fluid coupling valve 27 hard against the concave part-cylindrical support surface 107 so that fluid coupling valve 27 becomes fixed to the housing structure of the hydrostatic transaxle 1.

The shape in the housing interior defining the concave part-cylindrical support surface 107 combined to the shape of the concave part-cylindrical surface 58 formed to one side of the block element 49 can be said to describe a cylinder whose longitudinal axis is coincident with the rotational axis of the input drive-shaft 20.

On cylindrical element 35, a peripheral circumferential groove 110 may be provided so that a positioning device, such as a circlip and/or thrush washer 111 can be located. As shown in FIG. 1, such a circlip washer 111 sets the axial position of the first cylinder-barrel 25 so that it is preventing from contacting either the block element 49 or any of the other component parts of the hydraulic motor 5 which are located below the level of the hydraulic pump 4. Preferably, cylindrical element 35 and the block element 49 that comprise the fluid coupling valve 27 should be made from dissimilar materials. Therefore, cylindrical element 35 is preferably a heat-treated steel product whereas the block element 49 is a fused sintered powder-metal product.

Figure 12:
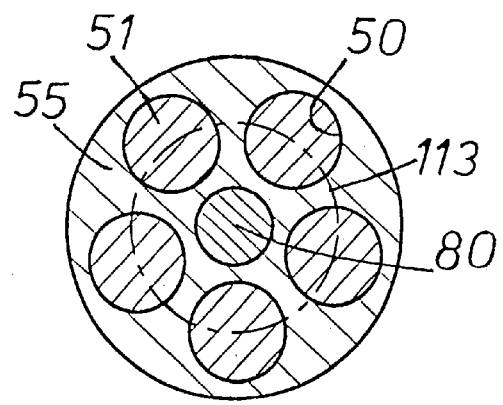
FIG. 12 is a sectional end view of the second cylinder-barrel component.

As also best seen in FIGS. 1 & 2, the stroking axes of all of the radial pistons 36 lie along a common plane designated 112 and set normal to the rotational axis of first cylinder-barrel 25 of the radial piston pump 4, whereas in the hydraulic motor, the array of axially arranged cylinders 50 are set equally spaced apart about a circle 113 shown in FIG. 12 described by the stroking axes of axial pistons 51. This circle 113 is shown to lie radially within the radial outer dimension of the second cylinder-barrel 55 of the hydraulic motor 5 such that the stroking axes of all these axial pistons 51 lie parallel to the rotational axis of the second cylinder-barrel 55. Furthermore, the stroking axes of the radial pistons 36 are disposed parallel to and offset from the rotational axis of motor cylinder-barrel 55 that lies coincident with parting-plane 8. As clearly apparent, this new configuration for a single pump and motor hydrostatic transmission is extremely compact, especially in terms of height, and the relatively flat radial piston pump 4 rides above the level of the axial piston motor 5 so that the most beneficial characteristic of each respective hydrostatic machine type can be fully exploited for improved performance within a minimum of volume space.

This invention may be adapted so that the first cylinder-barrel is drivingly connected to the input drive-shaft by a spur gear train. The hydraulic motor can be mechanically coupled to the output drive-shaft or shafts, either directly or through the gear reduction train, having or not having as the case may be, a mechanical differential in-between. During operation of the hydrostatic transaxle 1, rotation of input-shaft 20 causes first cylinder-barrel 25 to rotate and results in the reciprocation of pistons 36 when the track-ring 40 is eccentrically positioned by the control-shaft 43 with respect to the radial position of the first cylinder-barrel 25. Fluid then flows through internal passages 28, 61 and 29, 62 in the fluid coupling valve 27 to then enter the cylinders 55 of the second cylinder-barrel 55 of the hydraulic motor 5. The pressure medium acting on the pistons 51 causes the pistons 51 to commence reciprocation within their respective cylinder bores 55, and due to the side force created by the pistons 51 against the surrounding wall of each cylinder bore 55, the second cylinder-barrel 55 is caused to rotate. The rotation of cylinder-barrel 55 and shaft 80 results in mechanical power being transmitted through gears 87, 88, 93 to the ring gear 94 of the differential assembly 16 and the axle output shafts 2, 3 that drive the wheels of the vehicle.

What is claimed is:

1. A hydrostatic transmission located within a chamber defined by a surrounding housing structure and comprising a hydraulic pump and a hydraulic motor fluidly coupled together;
    a pump input and a motor output drive-shaft rotatably mounted in said housing and extending into said chamber and where the longitudinal axis of said pump input drive-shaft defines a vertical plane and where said motor output drive shaft is disposed in perpendicular relationship with respect to said pump input drive-shaft;
    said pump having a first cylinder-barrel containing an array of radially arranged cylinders and a radial piston disposed in each of said radial cylinders and including a track ring radially outwardly disposed of the radial pistons of said pump, said track ring guiding said radial pistons and being eccentrically pivotable about said vertical plane and where the stroking axes of said radial pistons all lie along a common plane normal to said vertical plant;
    said motor having a second cylinder-barrel containing an array of axially arranged cylinders set equally spaced apart about a circle described by the stroking axes of axial pistons disposed in said axial cylinders to lie radially within the radial outer dimension of said second cylinder-barrel and where said axial pistons are operatively connected to an adjacent thrust plate said thrust plate positioned within said housing in a location lying radially to one side of said vertical plane and beyond the boundary defined by the outer diameter of said annular track-ring.

2. A hydrostatic transmission according to claim 1 wherein said first cylinder-barrel is connected to said pump input drive-shaft to rotate at equal speed whereas said second cylinder-barrel is connected to said motor output drive-shaft to rotate at equal speed.

3. A hydrostatic transmission according to claim 2 wherein the stroking axes of said axial pistons lie normal to said vertical plane.

4. A hydrostatic transmission according to claim 3 and including at least one outwardly extending output power transmission shaft rotatably supported in said housing and wherein speed reduction gearing is further included in said housing such that said hydraulic motor is mechanically coupled to said output power transmission shaft by said speed reduction gearing.

5. A hydrostatic transmission according to claim 4 wherein said chamber is divided by the interior housing structure into a hydro chamber and a gear chamber, said hydro chamber for containing said pump and motor and said gear chamber for containing said speed reduction gearing, and whereby fluid contained in said hydro chamber is prevented from entering said gear chamber.

6. A hydrostatic transmission according to claim 4 and including a mechanical differential in said housing and drivingly connected between said speed reduction gearing and two outwardly extending output power transmission shafts.

7. A hydrostatic transmission according to claim 6 wherein said chamber is divided by the interior housing structure into a hydro chamber and a gear chamber, said hydro chamber for containing said pump and motor and said gear chamber for containing said speed reduction gearing and said mechanical differential, and whereby fluid contained in said hydro chamber is prevented from entering said gear chamber.

8. A hydrostatic transmission according to claim 3 wherein said pump and motor are hydraulically connected together by a fluid coupling valve and where said fluid coupling valve includes a cylindrical pintle ported portion to provide a journal for said first cylinder-barrel and a flat distributor valve plate portion providing a motor mounting surface for said second cylinder-barrel.

9. A hydrostatic transmission according to claim 8 wherein the longitudinal axis of said cylindrical pintle ported portion lies parallel to said vertical plane and where said flat distributor valve plate portion is positioned within said housing in a location lying radially to one side of said vertical plane and within the boundary defined by the outer diameter of said annular track-ring.

10. A hydrostatic transmission according to claim 3 wherein said pump and motor are hydraulically connected together by a fluid coupling valve and where said pump is attached to an upper surface of said fluid coupling valve whereas said motor is attached to a lower side surface of said fluid coupling valve, and where a pair of check-valves reside nearer the lower than the upper side surfaces.

11. A hydrostatic transmission according to claim 3 wherein said housing comprises two halves fastened together and defining an interface where said halves meet; and where said chamber comprises a hydro chamber and a gear chamber, said hydro chamber containing said pump and motor and said gear chamber containing said speed reduction gearing and differential and wherein fluid contained within said hydro chamber is prevented from entering said gear chamber.

12. A hydrostatic transmission according to claim 3 wherein said housing is defined by at least two housing elements and where one housing element is the cover and another housing element is the case, said cover and case elements being joined together along a parting-plane arranged to be perpendicular to the longitudinal axis of said pump input drive-shaft; and where said chamber comprises a hydro chamber and a gear chamber, said hydro chamber containing said pump and motor and said gear chamber containing said speed reduction gearing and differential and wherein fluid contained within said hydro chamber is prevented from entering said gear chamber.

13. A hydrostatic transmission according to claim 12 wherein said hydro chamber is divided into first and second regions, said first region extending transversely from said parting-plane for receiving said first cylinder-barrel in a location to be engaged to said pump input drive-shaft, said second region extending parallally from said patting-plane for receiving said second cylinder-barrel in a location to be engaged to said motor output drive-shaft.

14. A hydrostatic transmission according to claim 3 wherein said housing is defined by at least two housing elements and where one housing element is the cover and another housing element is the case, said cover and case elements being joined together along a parting-plane arranged to be perpendicular to the longitudinal axis of said pump input drive-shaft, said chamber being divided into first and second regions, said first region extending transversely from said parting-plane for receiving said first cylinder-barrel in a location to be engaged to said pump input drive-shaft, said second region extending parallally from said parting-plane for receiving said second cylinder-barrel in a location to be engaged to said motor output drive-shaft.

15. A hydrostatic transmission located within a chamber defined by a surrounding housing structure and comprising a variable stroke radial piston pump including a series of pistons and cylinder assemblies grouped about a first center and a fixed displacement axial piston motor including a series of piston and cylinder assemblies grouped about a second center and having a greater maximum stroke than said pump;

said pistons of said pump being operatively connected to a surrounding annular track-ring whereas said pistons of said motor being operatively connected to an adjacent thrust-plate, said thrust-plate inclined with respect to the stroking axes of the motor pistons and positioned within said housing in a location lying radially to one side of said first center and beyond the boundary defined by the outer diameter of said annular track-ring.

16. A hydrostatic transmission according to claim 15 and including a pump input and a motor output drive-shaft rotatably mounted in said housing and extending into said chamber; said pistons and cylinder assemblies grouped about a first center are disposed in a first cylinder-barrel and said piston and cylinder assemblies grouped about a second center are disposed in a second cylinder-barrel such that said first cylinder-barrel is connected to said pump input drive-shaft to rotate at equal speed where said second cylinder-barrel is connected to said motor output drive-shaft to rotate at equal speed.

17. A hydrostatic transmission according to claim 16 wherein said pistons and cylinder assemblies grouped about a first center are hydraulically connected to said piston and cylinder assemblies grouped about a second center by a fluid coupling valve formed with internal fluid passages, said fluid coupling valve includes a cylindrical pintle ported portion to provide a journal for said first cylinder-barrel and a flat distributor valve plate portion providing a motor mounting surface for said second cylinder-barrel.

18. A hydrostatic transmission according to claim 17 wherein said flat distributor valve plate portion is positioned within said housing in a location lying radially to one side of said first center and within the boundary defined by the outer diameter of said annular track-ring.

19. A hydrostatic transmission according to claim 16 wherein said pistons and cylinder assemblies grouped about a first center are hydraulically connected to said piston and cylinder assemblies grouped about a second center by a fluid coupling valve formed with internal fluid passages, said fluid coupling valve having an upper surface and a lower surface, said upper surface providing a journal for said first cylinder-barrel, said lower surface providing a motor mounting surface for said second cylinder-barrel.

20. A hydrostatic transmission according to claim 19 and including a pair of check-valves residing nearer the lower than the upper side surfaces of said fluid coupling valve.

21. A hydrostatic transmission according to claim 16 wherein the longitudinal axis of said pump input drive-shaft is positioned to pass through said first center.

22. A hydrostatic transmission according to claim 16 wherein the longitudinal axis of said pump input drive-shaft is positioned to intersect said second center.

23. A hydrostatic transmission located within a chamber defined by a surrounding housing structure and comprising a variable stroke radial piston pump including a series of pistons and cylinder assemblies disposed in a first cylinder-barrel and a fixed displacement axial piston motor including a series of piston and cylinder assemblies disposed in a second cylinder-barrel and having a greater maximum stroke than said pump;

said pistons of said pump being operatively connected to a surrounding annular track-ring whereas said pistons of said motor being operatively connected to an adjacent inclined thrust-plate;

first and second cylinder-barrels being hydraulically connected together by a fluid coupling valve formed with internal fluid passages and where said fluid coupling valve includes a cylindrical ported portion to provide a journal for said first cylinder-barrel and a flat distributor valve plate portion to provide a motor mounting surface for said second cylinder-barrel, said flat distributor valve plate portion positioned within said housing in a location lying radially within the boundary defined by the outer diameter of said annular track-ring;

and including a pump input and a motor output drive-shaft rotatably mounted in said housing and extending into said chamber to connect with first and second cylinder-barrels respectively such that said first cylinder-barrel and said pump input drive-shaft rotate at equal speed and said second cylinder-barrel and said motor output drive-shaft rotate at equal speed.

* * * * *

UNITED STATES PATENT AND TRADEMARK OFFICE
CERTIFICATE OF CORRECTION

PATENT NO.    : 6,477,838 B1
DATED         : November 12, 2002
INVENTOR(S)   : Thoma et al.

It is certified that error appears in the above-identified patent and that said Letters Patent is hereby corrected as shown below:

<u>Column 9,</u>
Line 51, change "plant" to -- plane --.
Line 58, change "plate" to -- plate, --.

Signed and Sealed this

Eighteenth Day of March, 2003

JAMES E. ROGAN
*Director of the United States Patent and Trademark Office*